United States Statutory Invention Registration [19]

[11] Reg. Number: H634

Nieri et al. [43] Published: Jun. 6, 1989

[54] FLOWMETER PRESSURE RELIEVING DEVICE

[75] Inventors: Dario Nieri; Cesare Zanon, both of Pianoro, Italy

[73] Assignee: Emerson Electric Company, St. Louis, Mo.

[21] Appl. No.: 241,489

[22] Filed: Sep. 8, 1988

[51] Int. Cl.[4] ..... G01F 15/00

[52] U.S. Cl. ..... 73/272 R

*Primary Examiner*—Thomas H. Tarcza
*Assistant Examiner*—Linda J. Wallace
*Attorney, Agent, or Firm*—Polster, Polster & Lucchesi

[57] ABSTRACT

A flowmeter for measuring the flow of fluids through a conduit is disclosed and includes a body having a passageway therethrough mounted in communication with a conduit. A cover is assembled to the flowmeter body and contains a flowmeter device which measures the flow of fluids in the body passageway. An O-ring is compressed between the body and cover to seal the flowmeter device relative to the body passageway, and the O-ring is also exposed to fluid pressure within the body passageway. When excessive pressure is encounterred within the flowmeter, the resistance of the O-ring to movement is overcome and the O-ring can be moved to a position enabling the excessive pressure to be vented to atmosphere. No damage to the flowmeter occurs when the pressure is relieved, and the flowmeter can be re-set on site without any need for replacement of components.

17 Claims, 2 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

FLOWMETER PRESSURE RELIEVING DEVICE

BACKGROUND OF THE INVENTION

This invention relates to flowmeters, and more particularly, to a flowmeter pressure relieving device.

Flowmeters are used in a variety of industrial, commercial, medical and military applications to measure the flow of fluids in conduits and pipes. In the USA market, flowmeter design must meet the Compressed Gas Association (CGA) guidelines. The CGA Standard E-7 "Standard for Flowmeters, Pressure Reducing Regulators, Regulator/Flowmeter and Regulator/-Flow-Guage Combinations for the Administration Medical Gasses" 1983 sets forth the minimum performance and safety requirements for this type of equipment. Section 7.5 of CGA Standard E-7 specifically deals with flowmeter performance, i.e., minimum burst strength and external lakage of the flowmeter. In essence, these standards require no bursting or fragmentation of the flowmeter when subjected to four times its maximum pressure.

Since the weakest part of the flowmeter is the flowmeter cover, the challenge that has confronted the prior art has been to design a cover which does not burst or fragment when subjected to excessive pressure. Rather than causing bursting or flying cover fragments, the current trend of the prior art is to design a cover so that if rupture occurs, the cover is more likely to bend or deform, without bursting or fragmentation.

Even in those prior art designs where bursting or fragmentation of the cover has been eliminated, once failure occurs, the cover must be replaced in order for the flowmeter to function properly. Depending on the application, obtaining a new flowmeter cover can not only be expensive, but may keep the flowmeter out of service. Unfortunately, this results in costly delays, inconvenience to the user, and unnecessary down time.

SUMMARY OF THE INVENTION

Among the several objects and advantages of the present invention include:

the provision of a flowmeter pressure relieving device which allows excessive pressure within the flowmeter to be relieved without damage of any kind to the flowmeter or any component thereof;

the provision of such a flowmeter pressure relieving device which has a fail-safe design enabling excessive pressure to be relieved within the flowmeter without bursting or fragmenting any component thereof;

the provision of such a flowmeter pressure relieving device which employs a dynamic O-ring design that eliminates deformation and/or destruction of flowmeter components as well as replacement costs and lost time associated with prior art designs;

the provision of such a flowmeter pressure relieving device which enables down sizing of flowmeter components and elimination of prior art rupturing/deformation of components, for substantial cost improvement and better operation of the flowmeter using less components; and the provision of such a flowmeter pressure relieving device which meets and/or exceeds all safety and use standards and requirements for flowmeters.

Briefly stated, the present invention provides a flowmeter for measuring the flow of fluid through a conduit, the flowmeter having a body mounted relative to the conduit with a passageway therethrough which communicates with the conduit. A flowmeter cover is assembled to the flowmeter body and contains a flowmeter device therein for measuring the flow of liquids in the body passageway. An O-ring is compressed between the body and cover to seal the flowmeter device within the cover relative to the body passageway. Inside vent openings are provided in one of the body and cover communicating with and permitting the O-ring to be exposed to fluid pressure within the body passageway. Sufficient fluid pressure within the body passageway causing circumferential enlargement of the O-ring or moving the O-ring out of compressive engagement between the body and cover. Outside vent openings are provided in one of the body and cover which communicate with the inside vent openings through the area evacuated by the O-ring for venting the excess fluid pressure therethrough to atmosphere, without causing any damage to the flowmeter. The flowmeter device within the cover may include a flowmeter tube which is rotatably adjusted relative to the body after partial disassembly of the cover relative to the body, with spring means maintaining the flowmeter tube in the desired orientation during the partial disassembly, as well as when the cover and body are fully re-assembled again.

Other objects and features of this invention will be come apparent from the description that follows.

BRIEF DESCRIPTION OF THE DRAWINGS

In the drawings.

Corresponding reference characters indicate corresponding parts throughout the several views of the drawings.

DESCRIPTION OF THE PREFERRED EMBODIMENT

While the flowmeter pressure relieving device of the present invention can be used where the fluid is either a liquid or gas, the flowmeter pressure relieving device will be described and illustrated in connection with a gas flowmeter, as will be apparent.

Figure 1:
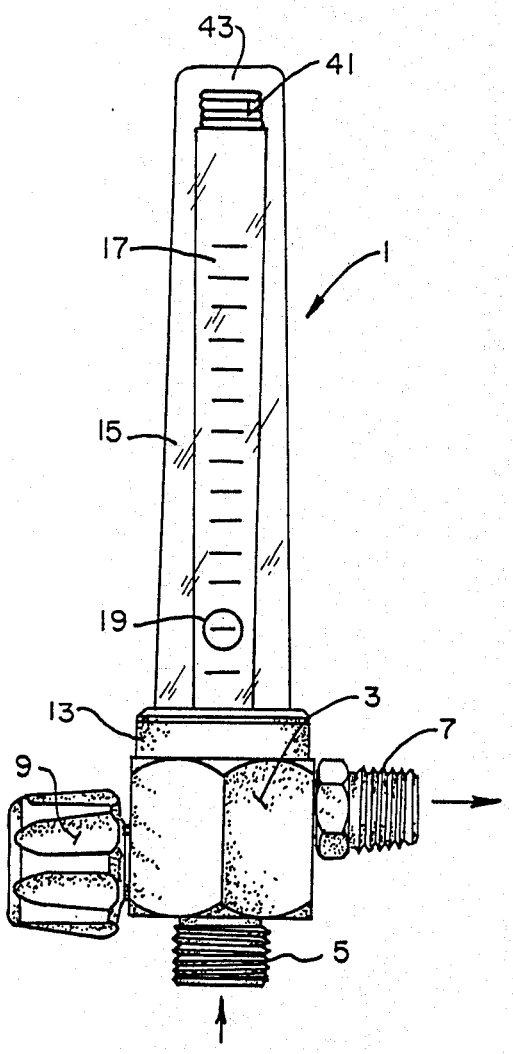
FIG. 1 is a rear elevational view of a flowmeter which is constructed in accordance with the teachings of the present invention.
Figure 2:
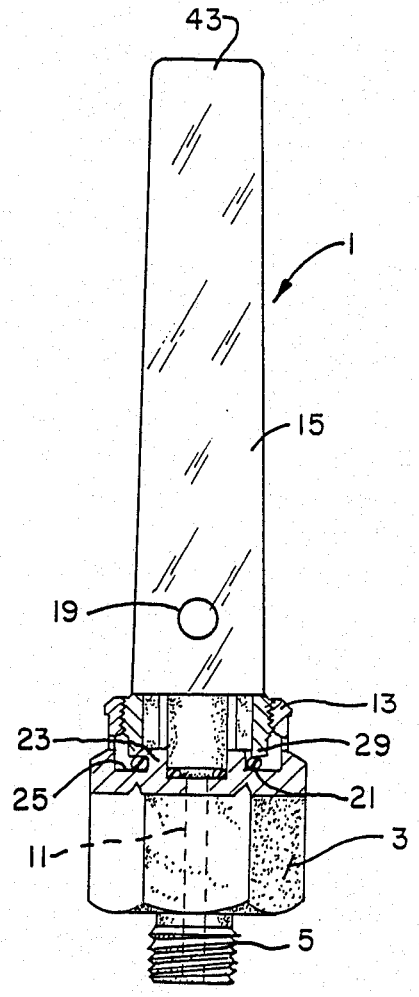
FIG. 2 is a fragmentary front elevational view, partly in section, illustrating the construction and operation of the pressure relieving aspects of the flowmeter of the present invention.
Figure 4:
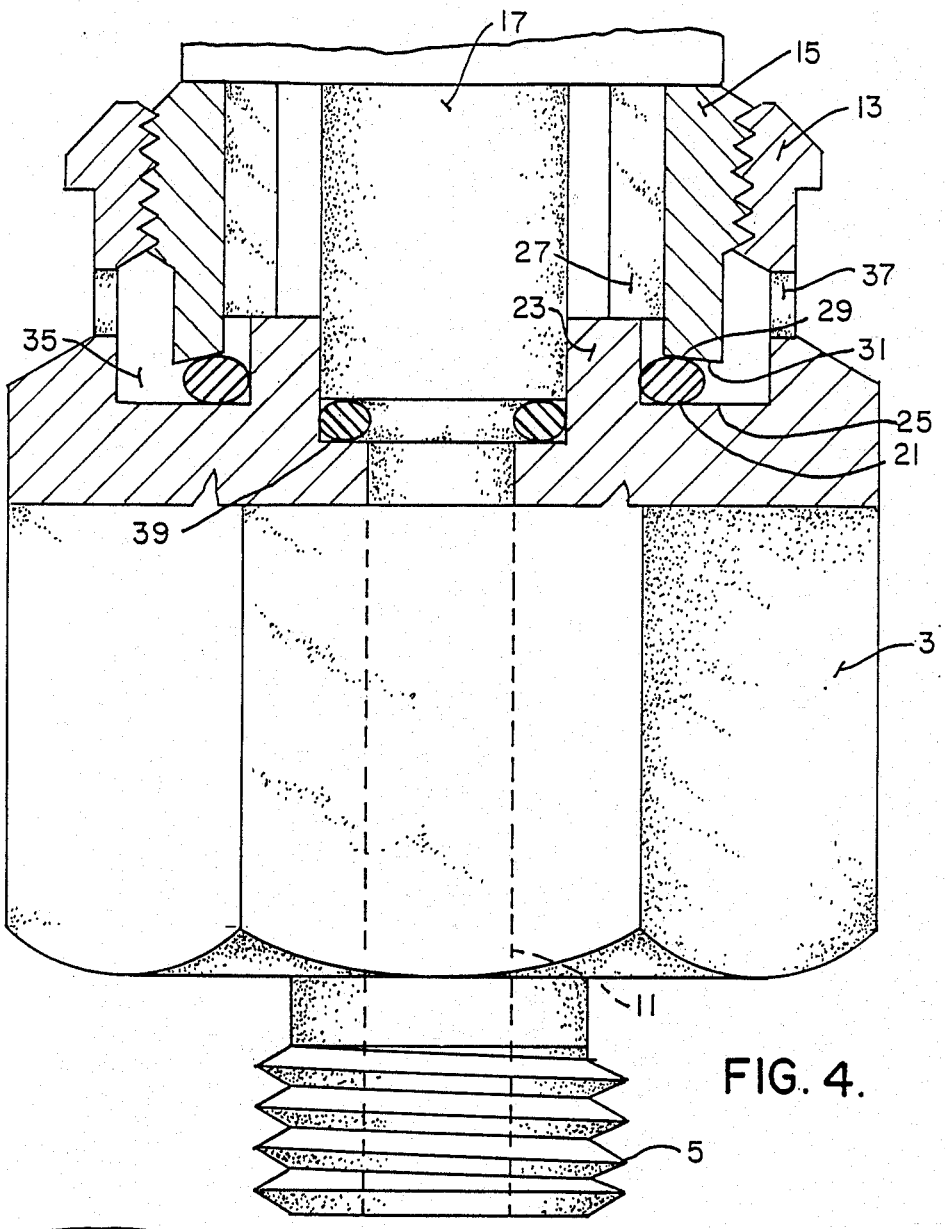
FIG. 4 is an enlarged fragmentary front elevational view, partly in section, illustrating the normal operating condition for the flowmeter pressure relieving device of the present invention, prior to encountering excessive pressure.
Figure 5:
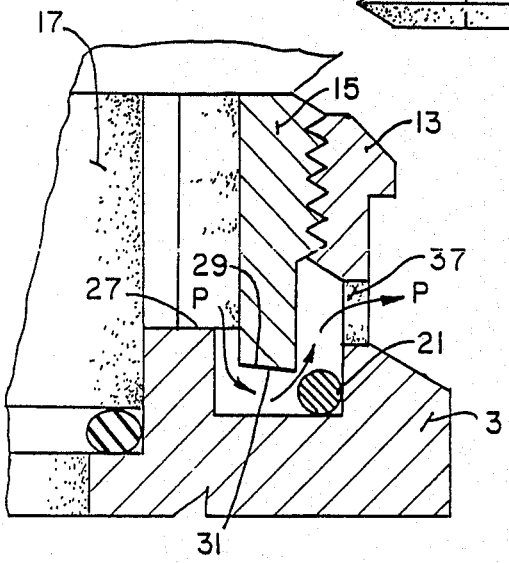
FIG. 5 is an enlarged fragmentary sectional view showing the movement of the dynamic O-ring of the pressure relieving device when excessive pressure within the flowmeter is encountered.

The flowmeter 1 is used for measuring the flow of fluid through a conduit, and for this purpose, includes a body 3 having a general polygonal configuration with an integral externaly threaded inlet tube 5 for connection to a conduit (not shown) at the lower end of the flowmeter 1 and an integral externally threaded outlet tube 7 extending from one side of the body 3 also for connection to a conduit (not shown). A rotary metering knob 9 is threadably mounted relative to the body 3 for increasing or decreasing the flow of fluid in the body 3 through passageway 11, which communicates with the inlet tube 5 and outlet tube 7, in a conventional manner, in order to permit fluid to flow through the flowmeter device 1. The flowmeter body further includes an internally threaded annular ring 13 which is threadably associated relative to an elongated hollow see-through plastic cover element 15 at a lower end thereof, as best seen in FIGS. 2 and 4–5 of the drawings. Within the elongated hollow cover element 15 is a flowmeter device in the form of a flowmeter tube 17 having a graduated scale on the outer surface thereof. A ball 19 within the flowmeter tube 17 registers the flow rate of the gas flowing through the flowmeter device 1 by the level to which it rises within the flowmeter tube 17.

All the components of the flowmeter 1 just described are well known and have been used in prior art constructions; however, it is at this point that the flowmeter pressure relieving device of the present invention departs from prior art constructions which have resulted in the aforementioned deficiencies and problems that have plagued prior art constructions.

The important features of the present invention relate to the fluid pressure relieving aspects of the flowmeter 1. For this purpose, an O-ring 21 is positioned about an upstanding annular neck portion 23 of the body 3 and rests upon a laterally outwardly offset surface portion 25 which is adjacent the upstanding annular neck portion 23. The relaxed inside diameter of the O-ring 21 is slightly smaller than the outer diameter of the upstanding annular neck portion 23 to provide a slight circumferential grip thereon.

In order to compress the O-ring 21 between the body 3 and the cover element 15, circumferentially extending shoulder means are provided for engaging and compressing the O-ring 21 as shown in FIGS. 2 and 4 of the drawings. The circumferentially shoulder means comprise laterally offset inner and outer shoulders 27 and 29 respectively which extend from the cover element 15. The inner shoulder 27 engages the upstanding annular neck portion 23 of the body and thus acts as a stop or limit to the threaded engagement between the body 3 and the cover element 15. Thus, the amount of compression of the O-ring 21 is controlled. The outer shoulder projects longitudinally beyond the inner shoulder 27 and includes a beveled under surface 31 having its lowest point at the outermost circumferential extent of the outer shoulder 29 in order to capture and compress the O-ring 21 against at least part of the upstanding annular neck portion 23 and the laterally outwardly offset surface portion 25, as shown best in FIG. 4 of the drawings.

Figure 3:
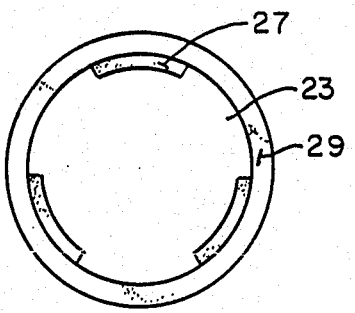
FIG. 3 is a top plan view of one of the flowmeter components which is used in conjunction with the dynamic O-ring in the pressure relieving device of the present invention.

Under normal operating pressures, the O-ring 21 remains compressed, in the manner just described, in order to seal the body and cover element 3 and I5 respectively relative to one another. If the pressure within the cover element 15 becomes excessive, as determined by O-ring parameters, area exposed, etc., the O-ring 21 will expand and expose the pressure to vents in the body in order to relieve the pressure build up. As best seen in FIG. 3 of the drawing, the inner shoulder 27 of the cover element 15 which contacts the upstanding annular neck portion 23 of the body, has a series of interruptions 33 which define inside vent openings. Thus, even while the shoulder 27 of the cover element 15 engages the upstanding annular neck portion 23 of the body 3, the interruptions 33 will enable any pressure within the flowmeter 1 to be directed against the O-ring 21.

When sufficient fluid pressure represented by the letter P in FIG. 5 of the drawings is great enough to overcome the resistance of the O-ring to movement, the O-ring 21 will be circumferentially enlarged as shown in FIG. 5. The laterally outwardly offset surface portion 25 has a lateral dimension greater than the outer shoulder 29 in order to enable the O-ring 21 to be circumferentially enlarged beyond the outer shoulder 21 when sufficient fluid pressure overcomes the resistance of the O-ring 21 to movement. Sufficient fluid pressure will move the circumferentially enlarged O-ring 21 into an annular throat area 35 adjacent to and extending beyond the outer shoulder 29 in the cover element 15 for receiving the O-ring 21. As best seen in FIG. 5 of the drawing, the configuration and dimensions of the aforesaid components enables the fluid pressure P to move past the O-ring 21 through the area evacuated by the O-ring 21 for venting the excess fluid pressure through outside vent openings 37 formed in the body.

The advantage of the aforesaid construction and components is that no permanent damage occurs to the flowmeter 1, which is quite different from prior art constructions. Furthermore, after the pressure has been relieved, the flowmeter 1 can be re-set on site, without replacing any components. This simply requires removing the cover element 15 from the body 3, rolling the O-ring 21 back in place around the upstanding annular neck portion 24, and replacement of the cover element. Not only is the time and cost of replacement significantly minimized, this fail-safe construction further allows the flowmeter to be down sized with elimination of a cover hold-down ring used in some prior art flowmeter designs. Thus, significant cost savings in the manufacture, use and maintenance of flowmeters, as the result of the flowmeter pressure relieving device of the present invention, are now possible.

The flowmeter tube 17 may have open ends in order to allow the fluid pressure to flow throughout the entire area of the cover element 15 or may be provided with openings adjacent the interruptions 23 and the inner shoulder 27 in order to allow the excess fluid pressure to be directed against the O-ring 21. Where the flowmeter tube 17 is desired to be sealed at its lower end relative to the body passageway 11, for alignment of a tubular channel within the flowmeter tube and the passageway 11, an O-ring 39 may be used to seal the flowmeter tube 17 relative to the body 3 around the body passageway 11.

Additionally, a coil spring 41 may be interposed between an upper outer end of the flowmeter tube 17 and closed end wall 43 of the elongated hollow element 15 for resiliently biasing the flowmeter tube 17 against the body 3 for compressing the O-ring 39 in order to achieve the sealing desired. The coil spring 41 may also be used to assist the alignment of the graduated scale on the flowmeter tube 17, as may be desired. Thus, the elongated cover element 15 may be partially disassembled from the body 3 to achieve the desired predetermined orientation of the graduated scale on the flowmeter tube 17, and then the coil spring 41 can be used to maintain the flowmeter tube 17 in the desired orientation as the elongated cover element 15 and the body 3 are again fully re-asembled.

From the foregoing, it will be appreciated that once excessive fluid pressure within the flowmeter is encountered, the movement of the dynamic O-ring out of a sealed and compressed condition enables the release of the excess fluid from the flowmeter, without causing any damage to any of the components of the flowmeter. Re-setting of the flowmeter is simple and may be done on-site without additional components or costly service costs.

In view of the above, it will be appreciated that the several objects of the invention are achieved and other advantageous results are obtained.

As various changes could be made in the above constructions without departing from the scope of the invention, it is intended that all matter contained in the above description are shown in the accompanying drawings shall be interpreted as illustrative and not in a limiting sense.

Having thus described the invention, what is claimed and desired to be secured by Letters Patent is:

1. A flowmeter for measuring the flow of fluid through a conduit, said flowmeter including a body mounted relative to said conduit and having a passageway therethrough communicating with said conduit, a cover assembled to said body and containing a flowmeter device therein for measuring the flow of liquids in said passageway, an O-ring compressed between said body and cover to seal the flowmeter device relative to said passageway, one of said body and cover being provided with inside vent openings communicating with and permitting said O-ring to be exposed to the fluid pressure in said passageway, sufficient fluid pressure within said passageway circumferentially enlarging and moving said O-ring out of compressive engagement between said body and cover, and outside vent openings provided on one of said body and cover which communicates with said inside vent openings through the area evacuated by the O-ring for venting the excess fluid pressure therethrough to atmosphere without causing any damage to the flowmeter.

2. The flowmeter as defined in claim 1 wherein said inside and outside vent openings are longitudinally offset from one another.

3. The flowmeter as defined in claim 2 wherein one of said vent openings is provided on said body and the other of said vent openings is provided in said cover.

4. The flowmeter as defined in claim 3 wherein the inside vent openings are provided in said cover and said outside vent openings are provided in said body.

5. The flowmeter as defined in claim 1 wherein said cover comprises an elongated hollow element having a closed end wall at an outer free end thereof, a flowmeter tube received within said elongated hollow element and communicating with the passageway in said body, spring means interposed between an outer end of said flowmeter tube and said closed end wall for resiliently biasing said flowmeter tube against said body, and a second O-ring extending between said flowmeter tube and said body and being compressed into sealing engagement therewith by said spring means.

6. The flowmeter as defined in claim 5 wherein said flowmeter tube is selectively rotatably adjusted and then maintained in a predetermined orientation by said spring means after partial disassembly of said body and cover, said cover and body being fully re-assembled to one another following said predetermined orientation.

7. A flowmeter for measuring the flow of fluid through a conduit, said flowmeter including a body mounted relative to said conduit and having a passageway therethrough communicating with said conduit, said body having an O-ring positioned about an upstanding annular neck portion and resting upon a laterally outwardly offset surface portion adjacent said upstanding annular neck portion, a flowmeter cover assembled to said body and containing a flowmeter device therein for measuring the fluid flow in said passageway, said cover having circumferentially extending shoulder means depending therefrom for engaging and compressing the O-ring between said shoulder means and the laterally outwardly offset surface portion of said body, inside vent openings provided in one of said cover and body adjacent said compressed O-ring to permit fluid pressure in said passageway to be directed against said compressed O-ring, the laterally outwardly offset surface portion on said body having a lateral dimension greater than said shoulder means on said cover to enable said O-ring to be circumferentially enlarged along said laterally outwardly offset surface beyond said shoulder means when sufficient fluid pressure overcomes the resistance of said O-ring to movement, and outside vent openings provided on said body which communicate with said inside vent openings through the area evacuated by the O-ring for venting the excess fluid pressure therethrough to atmosphere without causing any damage to the flowmeter.

8. The flowmeter as defined in claim 1 wherein said cover comprises an elongated hollow element for receiving a flowmeter tube therein for measuring fluid flow, and said flowmeter tube having an inner end in sealing engagement with the body and aligning a tubular channel in said flowmeter tube with the passageway in said body.

9. The flowmeter as defined in claim 8 wherein said elongated hollow element terminates in a closed end wall at an outer free end thereof, and spring means are interposed between an outer end of the flowmeter tube and said closed end wall for resiliently biasing said flowmeter tube against said body.

10. The flowmeter as defined in claim 9 wherein said flowmeter tube is rotatably adjusted relative to said body after partial dis-assembly of said cover relative to said body, and said spring means maintains said flowmeter tube in the desired orientation during said partial dis-assembly until said cover and body can be fully re-assembled again.

11. The flowmeter as defined in claim 10 wherein said shoulder means comprises circumferentially extending and laterally offset inner and outer shoulders depending from said cover, said inner shoulder engaging said upstanding annular neck portion for limiting said longitudinal assembly of said cover relative to said body, said outer shoulder projecting beyond the longitudinal extent of said inner shoulder for compressing the O-ring between said outer shoulder and said laterally outwardly offset surface portion.

12. The flowmeter as defined in claim 11 wherein said inner shoulder has circumferentially spaced interruptions therein defining said inside vent openings.

13. The flowmeter as defined in claim 1 wherein said outer shoulder includes a beveled undersurface having its lowest point at its outermost circumferential extent for capturing and compressing said O-ring against at least part of said upstanding annular neck portion and laterally outwardly offset surface portion of said body.

14. The flowmeter as defined in claim 1 wherein said O-ring when in circumferentially enlarged condition is capable of being moved into an annular throat which extends beyond the shoulder means to provide fluid communication between the inside and outside vent openings.

15. A flowmeter for measuring the flow of fluid through a conduit, said flowmeter including a body mounted relative to said conduit and having a passageway therethrough communicating with said conduit, said body having an upstanding annular neck portion surrounding said passageway with an O-ring mounted on said neck portion and resting upon a laterally outwardly offset surface portion adjacent said neck portion, a cover assembled to said body and containing a flowmeter device therein for measuring the flow of fluids in said passageway, said cover having circumferentially extending and laterally offset inner and outer shoulders depending therefrom, said inner shoulder being at least partially longitudinally aligned relative to the neck portion of said body for limiting the longitudinal assembly of said cover relative to said body, said outer shoulder projecting beyond the longitudinal extent of said inner shoulder and being at least partially aligned relative to the laterally outwardly offset surface of said body for compressing the O-ring therebetween to seal said cover relative to said body around said passageway, first vent openings provided in at least one of said inner and outer shoulders which communicates with an area containing said O-ring to enable fluid pressure to also be directed against said O-ring, second vent openings provided in said body which communicate with said first vent openings through the area containing said O-ring, and an annular throat adjacent to and extending beyond the outer shoulder in said cover for receiving said O-ring when circumferentially enlarged, whereby sufficient pressure in said passageway can overcome the resistance offered by said O-ring and cause the O-ring to be circumferentially enlarged and moved from its compressed state to a position within the annular throat in order to enable the first and second vent openings to be in fluid communication through the area evacuated by the O-ring for venting the excess fluid pressure therethrough to atmosphere without causing any damage to the flowmeter.

16. A flowmeter for measuring the flow of fluid through a conduit, said flowmeter including a body mounted relative to said conduit and having a passageway therethrough communicating with said conduit, a cover assembled to said body and containing a flowmeter device therein for measuring the flow of liquids in said passageway, expansion means having a first compressed position between said body and cover to seal the flowmeter device relative to said passageway, one of said body and cover being provided with inside vent openings communicating with and permitting said expansion means to be exposed to the fluid pressure in said passageway, sufficient fluid pressure within said passageway moving said expansion means to a second position out of engagement with said body and cover, and outside vent openings provided in one of said body and cover which communicate with said inside vent openings through the area evacuated by the expansion means for venting the excess fluid pressure therethrough to atmosphere without causing any damage to the flowmeter.

17. The flometer of claim 16 wherein said expansion means is an annulus.

* * * * *